United States Patent [19]
Koga et al.

[11] Patent Number: 5,970,390
[45] Date of Patent: Oct. 19, 1999

[54] TRANSMITTER AND AUTOMOBILE AUDIO APPARATUS USING THE SAME

[75] Inventors: Noriyuki Koga, Chiba; Noboru Nakagawa, Tokyo, both of Japan

[73] Assignee: Sony Corporation, Tokyo, Japan

[21] Appl. No.: 09/168,122

[22] Filed: Oct. 7, 1998

[30] Foreign Application Priority Data

Oct. 9, 1997 [JP] Japan ................................. 9-276762

[51] Int. Cl.$^6$ ................................................ H04J 5/00
[52] U.S. Cl. ........................ 455/42; 455/66; 455/63; 455/99; 455/345; 381/14; 381/79
[58] Field of Search ............................ 381/79; 455/6.3, 455/42, 66, 575, 20, 516, 426, 450, 99, 345

[56] References Cited

U.S. PATENT DOCUMENTS

| | | |
|---|---|---|
| 4,712,250 | 12/1987 | Michels . |
| 4,864,550 | 9/1989 | Kawanaka ................................. 369/6 |
| 5,093,924 | 3/1992 | Toshiyuki et al. ...................... 455/450 |
| 5,093,928 | 3/1992 | Kage ...................................... 455/516 |
| 5,319,716 | 6/1994 | McGreevy . |
| 5,628,056 | 5/1997 | Grysiewicz .............................. 455/575 |
| 5,768,345 | 6/1998 | Takebe et al. ........................... 455/464 |
| 5,774,805 | 6/1998 | Zicker ..................................... 455/426 |
| 5,826,198 | 10/1998 | Bergins et al. ......................... 455/557 |
| 5,842,119 | 11/1998 | Emerson et al. ..................... 455/161.3 |

Primary Examiner—Dwayne D. Bost
Assistant Examiner—S. Trinh
Attorney, Agent, or Firm—Jay H. Maioli

[57] ABSTRACT

A transmitter for transmitting an audio signal derived from an audio appliance to an FM (frequency modulation) radio includes a transmitter circuit for converting the audio signal derived from an audio appliance into an FM signal within an FM broadcasting band to thereby transmit the FM signal, a receiver circuit having at least a tuner unit; a display for displaying thereon a frequency; and a control circuit for controlling a transmission frequency of the transmitter circuit and a reception frequency of the receiver circuit. The control circuit causes the receiver circuit to detect an unused frequency within the FM broadcasting band and to set a frequency corresponding to the detected unused frequency to the transmission frequency, and also causes the display to display thereon the set transmission frequency.

3 Claims, 5 Drawing Sheets

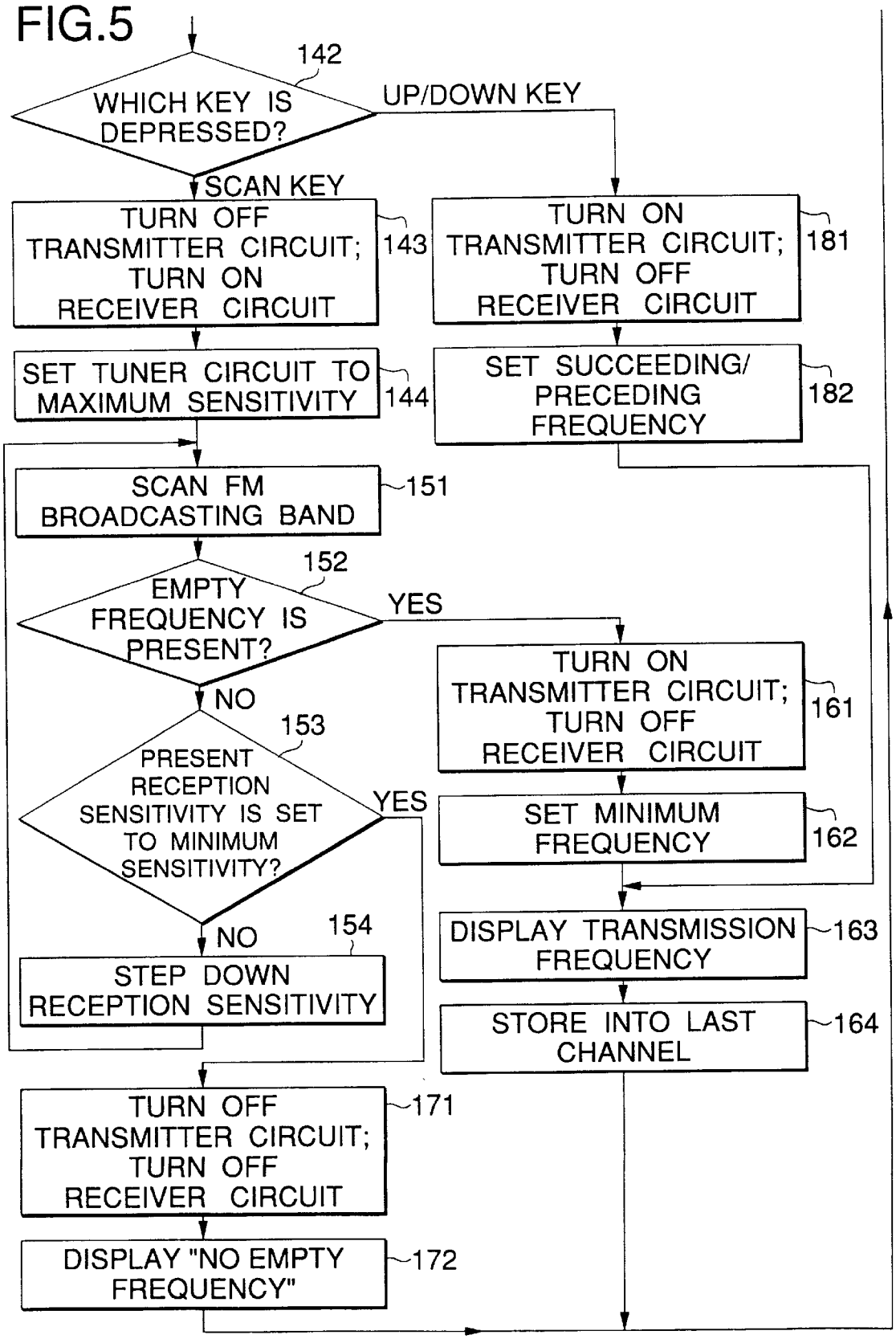

TRANSMITTER AND AUTOMOBILE AUDIO APPARATUS USING THE SAME

BACKGROUND OF THE INVENTION

The present invention is related to a transmitter used in combination with a compact and portable CD player, and also to an automobile audio apparatus using such a transmitter.

Even when no CD player is installed, or mounted on an automobile, if an FM radio is installed, or mounted on this automobile, then music recorded on a CD can be reproduced by using the speakers connected to this FM radio while a portable CD player and, for example, a transmitter 20 as shown in FIG. 1 are employed and this FM radio is operated. In other words, in FIG. 1, reference numeral 10 indicates a portable CD player, i.e., the normal type portable CD player having the various sorts of operation keys 11, an LCD 16 for displaying thereon the operation conditions, a headphone jack 12, and an external power supply jack 15 to which a DC voltage derived from an AC adaptor is applied as an operation voltage.

It should be understood that in the normal portable type CD player 10, speakers are not built therein. When a user listens to music recorded on a CD by using only such a normal portable type CD player 10, the user connects a headphone to the headphone jack 12 so as to listen to the music via this headphone.

A transmitter 20 include an FM transmitter circuit (not shown) for converting a stereophonic audio signal into an FM signal produced in accordance with the specification of the presently available FM broadcasting system. Moreover, this transmitter 20 has a plug 21 insertable into a cigarette lighter socket of an automobile (not shown). A cord 23 whose tip portion is connected to the headphone plug 22 is conducted from this transmitter 20, and also a cord 24 whose tip portion is connected to the DC plug 25 is conducted from this transmitter 20.

Then, when a user listens to a CD by using the FM radio installed on the automobile, the user inserts the headphone plug 22 into the headphone jack 12, and further inserts the DC plug 25 to the power supply jack 15. In addition, the user inserts the plug 21 into the cigarette lighter socket of the automobile.

As a result, the DC voltage appearing at this cigarette lighter socket is derived from the plug 21, and then is applied as the operation voltage to the FM transmitter circuit built in the transmitter 20, so that this FM transmitter circuit is brought into the operative state.

In addition, the DC voltage derived from the plug 21 is applied via the cord 24 and the plug 25 to the jack 15, and will become the operation voltage for the CD player 10.

Then, the key 11 is manipulated to set the CD player 10 to a reproduction mode. As a result, the CD is reproduced by this CD player 10 to output the audio signal reproduced from this CD to the headphone jack 12. This audio signal is supplied via the plug 22 and the cord 23 to the FM transmitter circuit of the transmitter 20 so as to be converted into the FM signal. Thus, this FM signal is transmitted in the wireless signal from outside the transmitter 20. At this time, when a knob 26 is rotated, the transmission frequency of this FM signal may be changed, or adjusted.

As a consequence, when this transmitted FM signal is received by the FM radio installed in the automobile, the music recorded on the CD reproduced by the CD player 10 can be heard from the speakers installed in this automobile.

At this time, all of the functions of the CD player 10 may be utilized by manipulating the key 11.

Furthermore, since the power supply voltage of the CD player 10 is derived from the cigarette lighter socket, no battery is required in this CD player 10. Also, the user need not pay attention to depletion of this cell energy.

As explained above, in accordance with this transmitter 20, the portable CD player 10 may be used in a similar manner to the CD player mounted on the automobile. This conventional technique is disclosed in, for example, U.S. Pat. No. 4,712,250.

In such a case that the user listens to the music recorded on the CD by using the above-explained transmitter 20, first, the user is required to set the reception frequency of the installed FM receiver to such a frequency of the FM broadcasting band where no broadcasting program is transmitted, namely an empty frequency. Next, the user must tune the transmission frequency of the transmitter 20 to the reception frequency of the FM receiver. Then, in order to perform this tuning operation, the user must rotate the knob 26 of the transmitter 20 so as to vary the transmission frequency while the user listens to the sounds produced from the speakers connected to the FM receiver.

However, such a tuning operation requires very cumbersome manipulations. In particular, very cumbersome and heavy workloads are necessarily required so as to seek the empty frequency in such a region where a large number of FM broadcasting programs are transmitted, for instance, in USA.

SUMMARY OF THE INVENTION

The present invention has been made to solve the above-described problems, and therefore, has an object to provide a transmitter capable of readily seeking an empty or unused frequency within an FM broadcasting band.

To achieve the above-described object, a transmitter, according to an aspect of the present invention, is featured by comprising:

a transmitter circuit for converting an audio signal derived from an audio appliance into an FM signal within an FM broadcasting band;

a receiver circuit;

a display; and a control circuit for controlling a transmission frequency of the transmitter circuit and a reception frequency of the receiver circuit. The reception frequency of the receiver circuit is set by the control circuit to detect an empty or unused frequency within the FM broadcasting band. This detected empty frequency is set to the transmission frequency of the transmitter circuit, and further is displayed on the display under control of the control circuit.

As a consequence, the empty frequency can be automatically selected, and the FM signal can be transmitted at this empty frequency. In addition, this empty frequency is displayed on the display, which can be observed by the user.

BRIEF DESCRIPTION OF THE DRAWINGS

For a better understanding of the present invention, reference is made of a detailed description to be read in conjunction with the accompanying drawings, in which:

FIG. 5 is a flow chart for describing the remaining portion of the frequency setting routine 100 indicated in FIG. 4.

DETAILED DESCRIPTION OF THE PREFERRED EMBODIMENTS

Referring now to drawings, various preferred embodiments of the present invention will be described.

Figure 1:
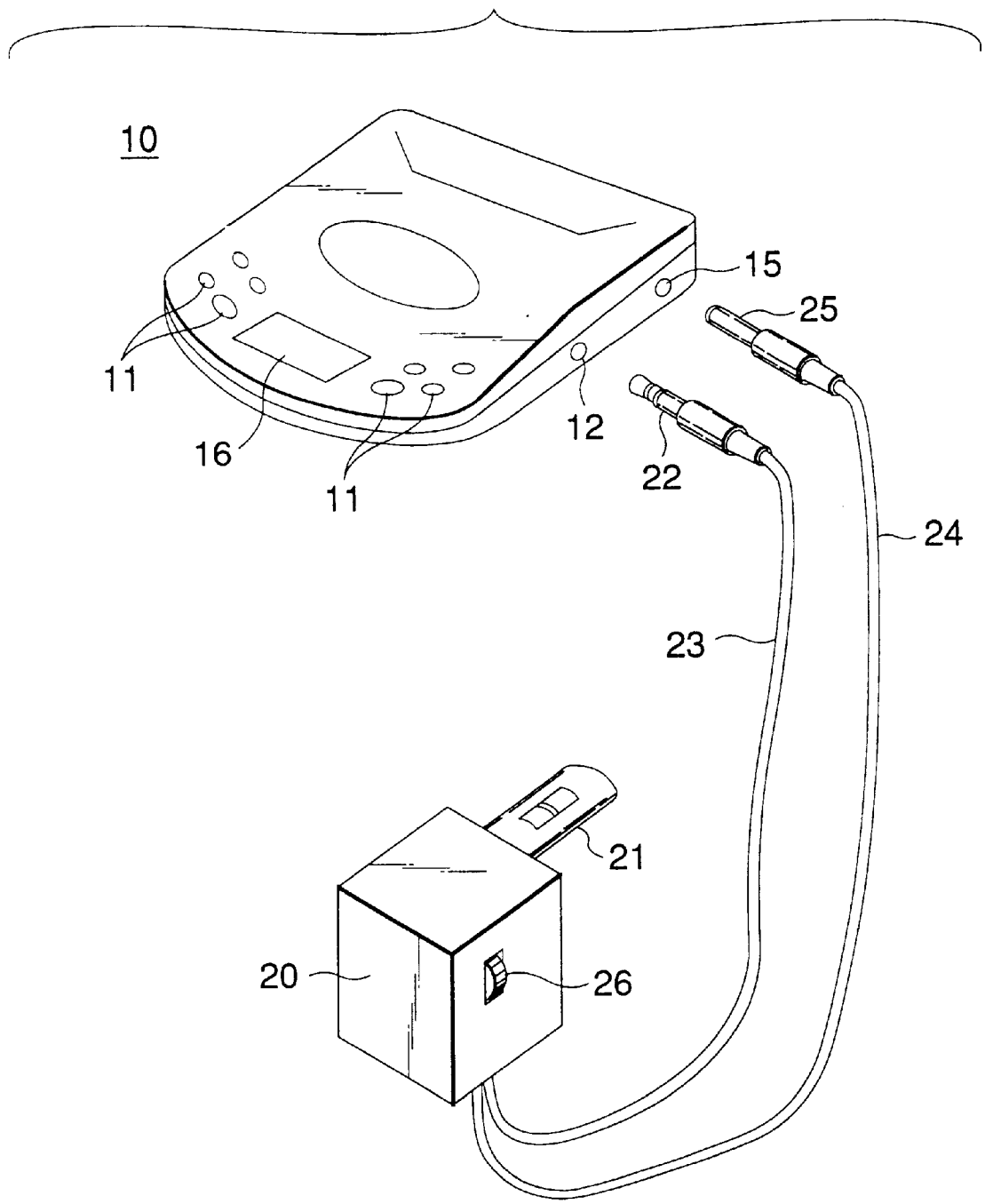
FIG. 1 is a perspective view for representing a major portion of the conventional automobile audio apparatus.
Figure 2:
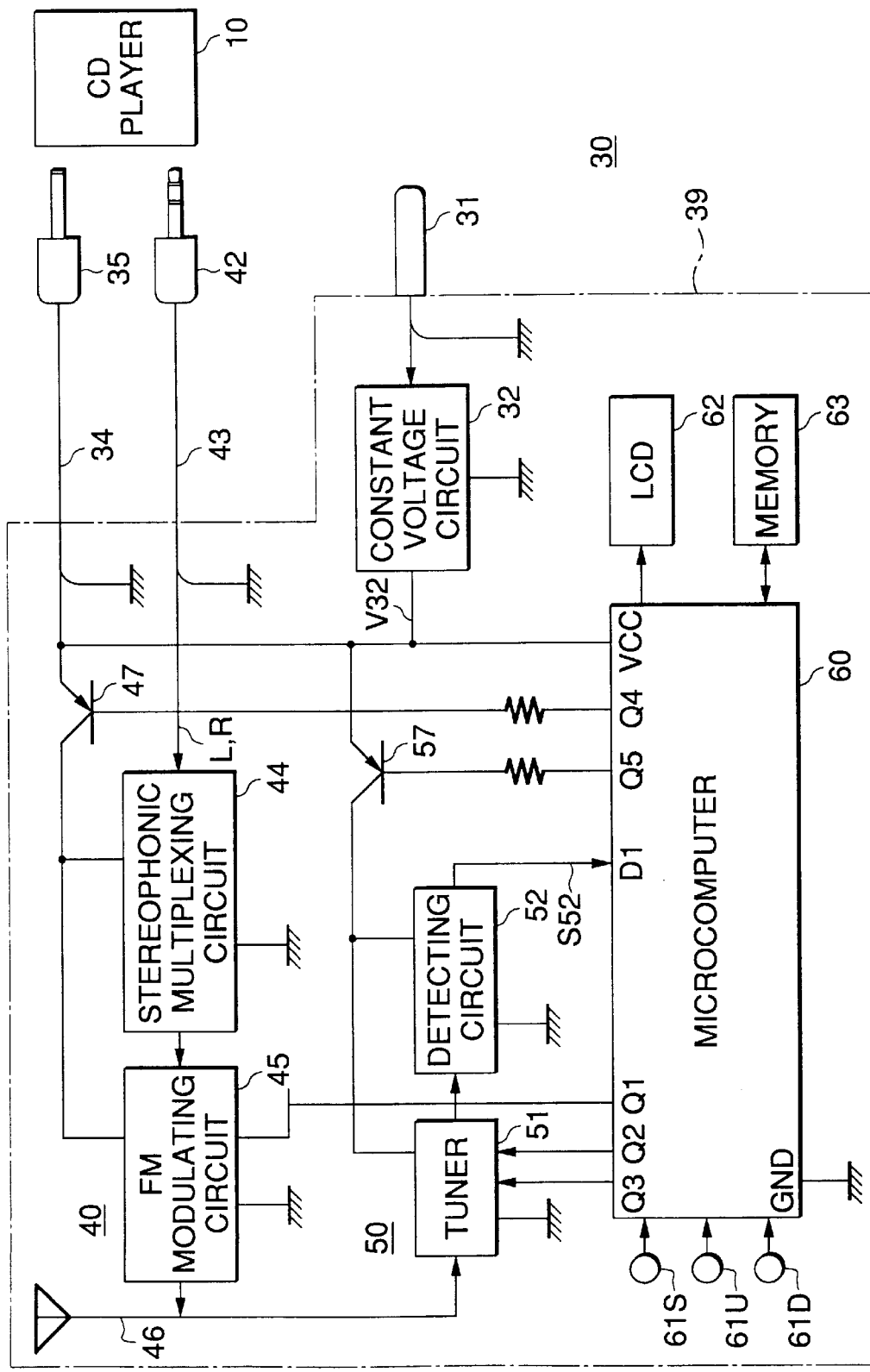
FIG. 2 is a block diagram of a transmitter used with an automobile audio apparatus according to an embodiment of the present invention.

FIG. 2 shows a block diagram of a transmitter 30 according to an embodiment of the present invention. This transmitter 30 contains a transmitter circuit 40 and a receiver circuit 50. In this case, the transmitter circuit 40 converts an audio signal produced from a portable CD (compact disk) player 10 into an FM (frequency modulation) signal to transmit the FM signal. To this end, this transmitter circuit 40 contains a headphone plug 42, a stereophonic multiplexing circuit 44, an FM modulating circuit 45, and an antenna 46.

The headphone plug 42 is inserted into a headphone jack 12 of the CD player 10 so as to derive a right-channel audio signal "R" and a left-channel audio signal "L" from this CD player 10. The stereophonic multiplexing circuit 44 converts the right/left-channel audio signals R/L supplied from the plug 42 into the stereophonic multiplex signals having the same specification as that of the presently available FM broadcasting system.

Furthermore, FM modulating circuit 45 converts the stereophonic multiplex signal derived from the multiplexing circuit 44 into the FM signal having the same specification as that of the presently available FM broadcasting system, and then supplies this converted FM signal to the antenna 46. As a consequence, although not shown in this drawing, the FM modulating circuit 45 is arranged with a PLL (phase-locked loop) circuit. Since the stereophonic multiplex signal is supplied to a VCO (voltage-controlled oscillator) of this PLL circuit, the FM modulation can be realized. Furthermore, a frequency dividing ratio of a variable frequency dividing circuit employed in this PLL circuit is varied, so that the transmission frequency can be varied.

Further, the receiver circuit 50 includes a tuner circuit 51 and a detecting circuit 52. Although not shown in this drawing, the tuner circuit 51 includes various internal circuits defined from an antenna input circuit to an FM demodulating circuit, which are arranged in the superheterodyne system. A local oscillator circuit of this tuner circuit 51 is constituted by a VCO of another PLL circuit. Then, since a frequency dividing ratio of a variable frequency dividing circuit employed in this PLL circuit is varied, a reception frequency in the FM broadcasting band may be changed into an arbitrary reception frequency. In addition, the reception sensitivity of the tuner circuit 51 can be varied in a preselected step.

Also, the detecting circuit 52 detects whether or not the receiver circuit 50 is tuned to a broadcasting signal based upon, for instance, a level of an intermediate frequency (IF) signal of this tuner circuit 51, and outputs a detection signal S52. It should be noted that in an actual case, the detecting circuit 52 is manufactured together with the tuner circuit 51 in a one-chip IC. As this detection signal S52, a tuning instruction signal may be used.

Moreover, this transmitter 30 contains a plug 31, a constant voltage circuit 32, and a DC plug 35. In this case, the plug 31 is inserted into a cigarette lighter socket of an automobile so as to derive a DC voltage. The constant voltage circuit 32 processes this DC voltage derived from the plug 31 to make up a constant DC voltage V32 having a predetermined value. Then, this constant DC voltage V32 is output from the constant voltage circuit 32 via a cord 34 to a DC plug 35, and is applied to a DC jack 15 of the CD player 10.

Also, the output terminal of the constant voltage circuit 32 is connected via an emitter-to-collector path of a switching transistor 47 to power supply lines of the stereophonic multiplexing circuit 44 and of the FM modulating circuit 45. Moreover, this output terminal is connected via an emitter-to-collector path of another switching transistor 47 to power supply lines of the tuner circuit 51 and of the detecting circuit 52.

Figure 4:
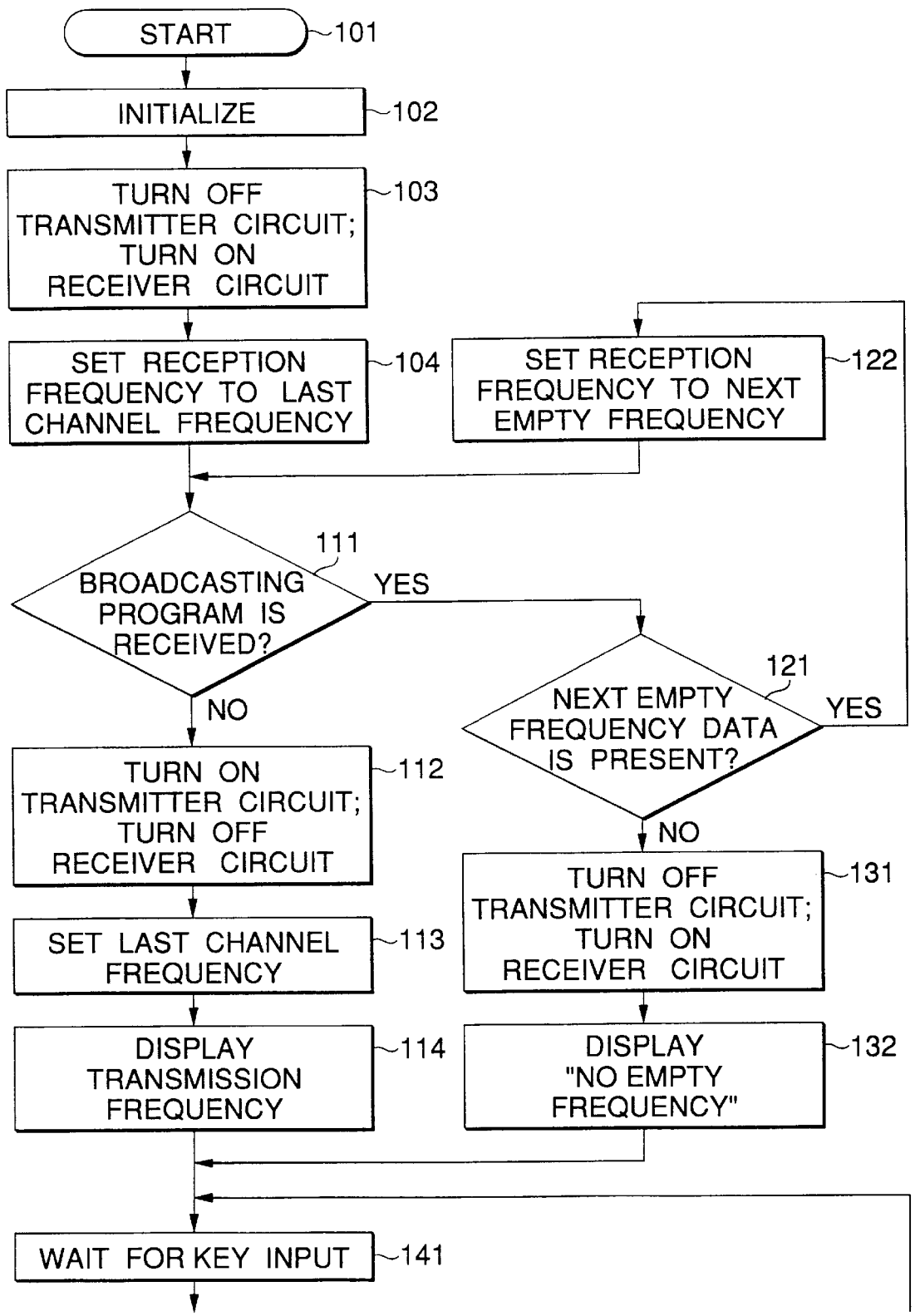
FIG. 4 is a flow chart for describing a portion of a frequency setting routine 100 executed by a microcomputer 60 employed in the transmitter shown in FIG. 2.

Furthermore, in this transmitter 30, a microcomputer 60 for controlling the entire system is provided. As this microcomputer 60, the 4-bit microcomputer model No. TC 9322FA manufactured by TOSHIBA CORPORATION is employed. The DC output voltage V32 of the constant voltage circuit 32 is applied as an operation voltage to the microcomputer 60. A frequency setting routine 100 as indicated in FIG. 4 and FIG. 5 may be prepared in this microcomputer 60. The frequency dividing ratios are supplied from output terminals Q1 and Q2 of the microcomputer 60 to the variable frequency dividing circuits within the FM modulating circuit 45 and the tuner circuit 51, respectively. Also, a control signal for a reception sensitivity is supplied from another output terminal Q3 of this microcomputer 60 to the tuner circuit 51. In addition, control signals are supplied from output terminals Q4 and Q5 of this microcomputer 60 to the bases of the transistor 47 and 57, and the detection signal S52 of the detecting circuit 52 is supplied to an input terminal D1 of the microcomputer 60.

Also, a scan key 61S, an up key 61U, and a down key 61D are connected as an operation key to this microcomputer 60. Further, an LCD (liquid crystal display) 62 and a memory 63 are connected to the microcomputer 60. In this case, the memory 63 is constructed of a ROM (read-only memory) capable of electrically writing/erasing data, or a RAM (random access memory) backed-up by a battery (not shown in detail). In other words, this memory 63 is arranged by a non-volatile memory capable of saving data written thereinto even when a power supply is turned OFF.

As will be described later, data related to an empty frequency within an FM broadcasting band is stored, and also data related to a frequency of a last channel (namely, data of transmission frequency which was used in preceding operation when power supply is turned OFF) is stored into this memory 63.

Figure 3:
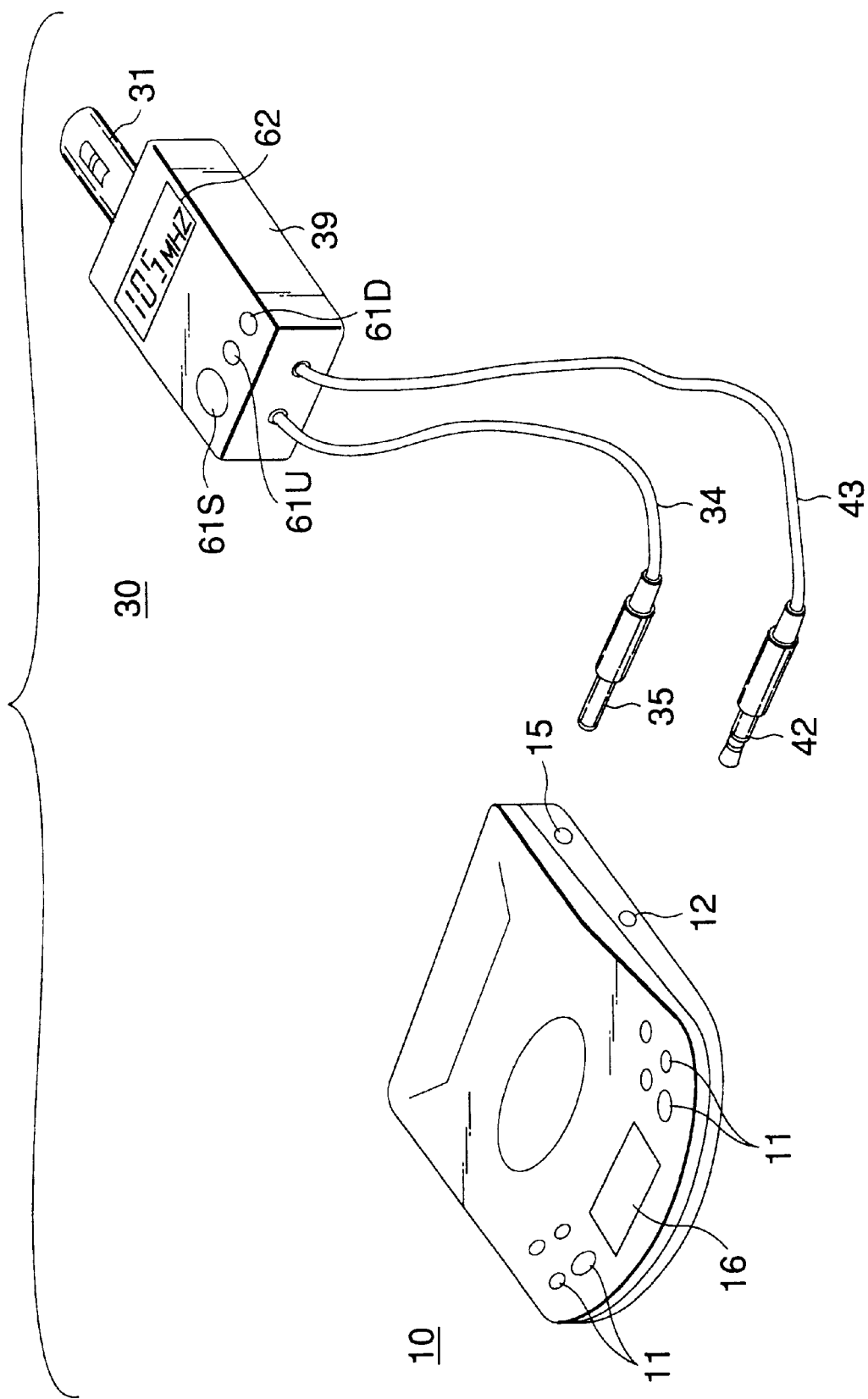
FIG. 3 is a perspective view for showing a major portion of the automobile audio apparatus according to the embodiment of the present invention.

FIG. 3 represents an example of another view of the above-described transmitter 30. As shown in this drawing, cords 34 and 43 mounted with plugs 35 and 42 at tip portions thereof are conducted from a main body portion 39 of this transmitter 30. Also, the above-described keys 61S to 61D and the LCD 62 functioning as the display unit are provided on this main body 39, and a plug 31 is provided in an integral form.

FIG. 3 indicates an example of another view of such a condition that the above-described transmitter 30 is connected to a general-purpose portable CD player 10. The transmitter 30 is arranged such that the cords 34 and 43 mounted with the plugs 35 and 42 at the tip portions thereof are conducted from the main body case 39 made of plastic. The keys 61S to 61D and the LCD 62 functioning as the display unit are provided on the main body case 39. Also, a flexible lead wire is positioned along an inner wall of the main body case 39, and the antenna 46 is formed by this lead wire. Although the antenna 46 is provided within the main body case 39 in this embodiment, this antenna 46 may be alternatively provided in such a way that this antenna 46 is projected outside the main body case 39.

When a user listens to music of a CD from a speaker connected to an FM receiver of an automobile with such an arrangement, the user inserts the headphone plug 42 into the headphone jack 12 of the CD player 10, and also the DC plug 35 into the power supply jack 15. Furthermore, the user inserts the plug 31 into the cigarette lighter socket of the automobile.

As a result, the DC voltage obtained from this cigarette lighter socket is applied to the constant voltage circuit 32, so that the constant DC voltage V32 is output from the constant voltage circuit 32. Then, this constant DC voltage V32 is applied as the operation voltage to the microcomputer 60. As a result, the microcomputer 60 commences a process operation of the frequency setting routine 100.

Although the detailed description of this frequency setting routine 100 will be discussed later, when the routine 100 is executed, the transistor 47 is turned ON, so that the constant DC voltage V32 is applied as the operation voltage to the FM modulating circuit 45 and the stereophonic multiplexing circuit 44. Thus, the transmitter circuit 40 is brought into an operative state. Also, the transmission frequency of the transmitter circuit 40 is set to an empty frequency, and furthermore this transmission frequency is displayed on the LCD 62.

The user tunes the reception frequency of this FM receiver to the empty frequency displayed on the LCD 62 by manipulating a channel selecting means of the FM receiver of the automobile, the power supply of which is under ON state. Accordingly, since the transmission frequency of the transmitter circuit 40 is set to the frequency displayed on the LCD 62, the FM receiver of the automobile is correctly tuned to the FM signal transmitted from the transmitter circuit 40, so that this FM receiver is capable of receiving this tuned FM signal. Then, when the CD player 10 is operated in the reproduction mode, audio signals "R" and "L" reproduced from a CD may be derived from the CD player 10 via the plug 42. These derived audio signals R and L are supplied via the cord 43 to the stereophonic multiplexing circuit 44 so as to produce a stereophonic multiplexed signal. This stereophonic multiplexed signal is supplied to the modulating circuit 45 in order to be converted into an FM signal having a frequency displayed on the LCD 62. This FM signal is transmitted from the antenna 46 in the form of the wireless FM signal.

At this time, since the FM receiver installed on the automobile is tuned to the transmission frequency of the transmitter circuit 40, this wireless FM signal can be received under correct conditions. As a result, the music of this CD reproduced by the CD player 10 may be produced from the speakers connected to the FM receiver mounted on the automobile.

In accordance with this transmitter 30, the reception frequency of the FM receiver is merely set to the frequency displayed on the LCD 62, so that the music of the CD can be readily reproduced by the CD player 10.

Referring now to flow charts shown in FIG. 4 and FIG. 5, the frequency setting routine 100 will be described.

That is, when the plug 31 of the transmitter 30 is inserted into the cigarette lighter socket of the automobile, the DC voltage V32 is applied as the operation voltage to the microcomputer 60. As a result, a process operation by a CPU of the microcomputer 60 starts from a first step 101 of this frequency setting routine 100. At a next step 102, the various circuit portions are initialized. At a subsequent step 103, the transistor 47 is turned OFF in response to the output signal of the terminal Q4 of this microcomputer 60, and further the transistor 57 is turned ON in response to the output signal of the terminal Q5 thereof.

As a consequence, since the transistor 47 is turned OFF at the time instant defined at the step 103, no operation voltage of the DC voltage V32 is applied to the FM modulating circuit 45 and the stereophonic multiplexing circuit 44, so that the transmitter circuit 40 is brought into the non-operative state. Also, since the transistor 57 is turned ON, the operation voltage is applied to the tuner circuit 51 and the detecting circuit 52, so that the receiver circuit 50 is brought into the operation state.

Then, at a next step 104, the data about the frequency of the last channel is read out from the memory 63, and this frequency data is converted into the data about the frequency dividing ratio of the corresponding reception frequency. This frequency dividing ratio data is supplied to the tuner circuit 51 so as to be set to the variable frequency dividing circuit. As a result, the reception frequency is set to the frequency of the last channel. Accordingly, the receiver circuit 50 commences the receiving operation at the transmission frequency used in the previous operation at the time instant defined at this step 104.

Subsequently, at a step 111, a check is made as to whether or not the broadcasting station is brought into the non-broadcasting state at the frequency set at the step 104 by checking the detection signal S52. In other words, a check is done as to whether or not there is an empty reception frequency. When an empty reception frequency is present, the process operation is advanced from the step 111 to a step 112. At this step 112, the transistor 47 is turned ON in response to the output signal from the terminal Q4 of the microcomputer 60, and further the transistor 57 is turned OFF in response to the output signal from the terminal Q5 thereof.

As a consequence, since the DC voltage V32 is applied as the operation voltage via the transistor 47 to the FM modulating circuit 45 and the stereophonic multiplexing circuit 44 at the step 112, the transmitter circuit 40 is brought into the operation condition. Also, since the transistor 57 is turned OFF, no operation voltage is applied to the tuner circuit 51 and the detecting circuit 52, so that the receiver circuit 50 is brought into the non-operative condition.

Subsequently, at a step 113, the frequency data of the last channel read from the memory at the step 104 is supplied from the terminal Q1 to the modulating circuit 45 so as to be set to the variable frequency circuit, so that the transmission frequency is set to the frequency of the last channel. Therefore, the transmitter circuit 40 restarts the FM signal transmission at the transmission frequency used in the previous operation.

Then, at the next step 114, the frequency data of the last channel read at the previous step 104 is converted into the display data of the corresponding transmission frequency. This display data is supplied to the LCD 62, so that the transmission frequency set at the step 113 is displayed in digital form on the LCD 62. Thereafter, the frequency setting routine 100 waits for a key input at a step 141.

As a result, the transmitter 30 restarts the FM signal transmission at the previously used frequency, and this transmission frequency is displayed on the LCD 62. Under this condition, the transmitter 30 waits for the key entry.

In the case that the reception frequency set at the step 104 is used at the step 111, the process operation is advanced from the step 111 to a step 121. At this step 121, a check is made as to whether or not a next empty frequency data is saved in the memory 63. When the next empty frequency data is saved in the memory 63, the process operation is advanced from the step 121 to the step 122. At this step 122, this next empty frequency data is read from the memory 63, after this next empty frequency data is converted into data about a frequency dividing ratio of a reception frequency corresponding thereto, the frequency dividing ratio data is supplied to the tuner circuit 51 so as to be set to the variable frequency dividing circuit. Thus, the reception frequency is set to the next empty frequency.

Then, thereafter, at the step 111, a check is made as to whether or not the reception frequency set at the above-described step 122 is actually empty. If the set reception frequency is actually empty, then this empty reception frequency is determined as a transmission frequency from a step 112 to a step 114. Also, this determined transmission frequency is displayed on the LCD 62. Conversely, if the set reception frequency is not actually empty, then the process operations defined at the steps 121 and 122 are repeatedly performed until the empty frequency can be found out.

Then, when all of the frequencies saved in the memory 62 are not empty, the process operation is advanced from the step 121 to a further step 131. At this step 131, the transistor 47 is turned OFF in response to the output signal of the terminal Q4, and also the transistor 57 is turned OFF in response to the output signal of the terminal Q5. As a result, both the transmitter circuit 40 and the receiver circuit 50 are brought into the non-operative conditions.

Then, at a next step 132, predetermined display data is supplied to the LCD 62. Then, this LCD 62 displays such a fact that there is no empty frequency. Thereafter, the process operation is advanced to a step 141 at which the CPU waits for a key input.

On the other hand, in the case that the transmitter 30 waits for the key input at the step 141, when any one of the scan key 61S, the up key 61U, and the down key 61D is depressed, the process operation is advanced from this step 141 to a further step 142. At the step 142, a judgement is made as to which key is depressed. Then, when the depressed key corresponds to the scan key 61S, the process operation is advanced from the step 142 to a step 143. At this step 143, the transistor 47 is turned OFF so as to bring the transmitter circuit 40 into the non-operative state, and furthermore the transistor 57 is turned ON in order to bring the receiver circuit 50 into the operative state. Next, at a step 144, the tuner circuit 45 is set to a maximum sensitivity in response to the output signal of the terminal Q3.

Subsequently, at a step 151, the reception frequency is sequentially changed at a preselected frequency step in response to the output signal from the terminal Q2. As a consequence, the frequencies defined from the minimum frequency in the FM broadcasting band up to the maximum frequency in this FM broadcasting band are sequentially scanned. During this frequency scanning operation, the check is done as to whether or not the empty frequency is present by investigating the detection signal S52. Then, the data of this empty frequency is written into the memory 63. At the step 151, the empty frequencies are sequentially detected within the FM broadcasting band in this manner. Thus, the data of the empty frequencies are stored in the memory 63.

Then, when the process operation defined at the step 151 is accomplished, the process operation is advanced to a further step 152. At this step 152, a judgement is made as to whether or not the empty frequency was present when the process operation defined at the step 151 is executed. Then, when none of the empty frequency is present, the process operation is advanced from the step 152 to a step 153. At this step 153, another judgement is made as to whether or not the present reception sensitivity of the receiver circuit 51 is set to the minimum sensitivity.

When the present reception sensitivity of the receiver circuit 51 is not set to the minimum sensitivity, the process operation is advanced from this step 153 to a further step 154. At this step 154, the reception sensitivity of the receiver circuit 51 is lowered only by 1 step. Thereafter, the process operation is returned to the previous step 151.

As a result, subsequently, the frequencies in the FM broadcasting band are scanned at a new reception sensitivity lower than the above-explained reception sensitivity only by 1 step, so that empty frequencies are successively detected.

Then, as a result of this scanning operation, if one empty frequency is found out even at any reception sensitivities, then this empty frequency is detected at the step 152, and the process operation is advanced from this step 152 to a step 161. At this step 161, the transistor 47 is turned ON so as to set the transmitter circuit 40 into the operative condition, and also the transistor 57 is turned OFF in order to set the receiver circuit 50 into the non-operative condition.

Next, at a further step 162, the data related to the minimum frequency is read out from the memory 63 among the frequency data, namely the empty frequency data stored into this memory 63 by the scanning operation of the step 151. This minimum frequency data is converted into frequency dividing ratio data of the corresponding transmission frequency, which is set to the variable frequency dividing circuit of the modulating circuit 45. As a consequence, at the step 162 the FM signal is transmitted from the transmitter circuit 45 at the minimum frequency selected from the empty frequencies detected at the step 151.

Subsequently, the process operation is advanced a further step 163. At this step 163, the display data indicative of the transmission frequency is supplied to the LCD 62, so that this transmission frequency is displayed on the LCD 62. Next, the data about the transmission frequency at this time is stored as the frequency data of the last channel into the memory 63. Thereafter, the process operation is returned to the previous step 141 at which the transmitter 30 waits for a key input.

As explained above, the empty frequencies are detected from the step 143 to the step 154, and the FM signal is transmitted, while using one of the empty frequencies during the process operations defined from the step 161 to the step 164, and further this transmission frequency is displayed on the LCD 62.

It should be understood that even when the reception sensitivity of the receiver circuit 51 is set to the minimum sensitivity, if there is no empty frequency, then this transmitter 30 cannot be used.

Then, in this case, the following judgments are made by executing process operations defined at steps 152 and 153. That is, none of such an empty frequency is present, and also, the reception sensitivity is the minimum sensitivity. Thus, the process operation is advanced from this step 153 to a further step 171. Then, at this step 171, both the transistors 47 and 57 are turned OFF, so that both the transmitter circuit 40 and the receiver circuit 50 are brought into the non-operative state. At a next step 172, predetermined display data is supplied to the LCD 62, and thus this LCD 62 displays that no empty frequency is present. Thereafter, the process operation is returned to the step 141 at which the transmitter 30 waits for a key input.

Furthermore, in the case that the transmitter 30 waits for the key input at the step 141, when either the up key 61U or the down key 61D is depressed, the process operation is advanced from the step 141 to a further step 142. In this case, since either the up key 61U or the down key 61D is depressed, the process operation is further advanced from the step 142 to a step 181. Then, at this step 181, the transistor 47 is turned ON so as to set the transmitter circuit 40 to the operative state, and also the transistor 57 is turned OFF so as to set the receiver circuit 50 to the non-operative state.

Next, at a step 182, either preceding frequency data or succeeding frequency data among the frequency data (namely, empty frequency data) stored in the memory 63 is read out from this memory 63. Then, data related to such a frequency dividing ratio defined when the empty frequency of this read data is used as the transmission frequency is set to the variable frequency dividing circuit of the modulating circuit 45. As a result, the empty frequency preceding or succeeding to the presently used transmission frequency will constitute a new transmission frequency, and thus, from this stage, the FM signal is transmitted at this new transmission frequency by the transmitter circuit 40.

Thereafter, the process operation is advanced to a step 163. At this step 163, this new transmission frequency is displayed on the LCD 62. Subsequently, this displayed transmission frequency is stored as the data about the frequency of the last channel into the memory 63 at a step 164, and then the process operation is returned to the previous step 141 at which the transmitter 30 waits for a key input.

As previously explained, in accordance with the frequency setting routine 100, when the plug 31 of the transmitter 30 is inserted into the cigarette lighter socket of the automobile, the transmission frequency of the transmitter circuit 40 is set to the empty frequency, and this set transmission frequency is displayed on the LCD 62.

Accordingly, as previously described, when the reception frequency of the FM receiver installed on the automobile is tuned to such a frequency displayed on the LCD 62, the user can listen to music, sounds and the like reproduced from the CD player 10 by using the speakers connected to this FM receiver.

As previously explained, in accordance with the transmitter 30, since the transmission frequency is displayed on the LCD 62, the user can readily tunes the reception frequency of the FM receiver to the transmission frequency of the transmitter 30. In other words, to user can listen to the music and the like reproduced from the CD player 10 by executing a similar operation when the general FM broadcasting channels are selected.

Moreover, since this empty frequency is automatically selected to perform the FM signal transmission, the user need not manipulate the key to select the transmission frequency.

Alternatively, when the transmitter 30 waits for the key input at the step 141, in such a case that either the up key 61U or the down key 61D is continued to be depressed for a long time period, for example, longer than 2 seconds, a check is sequentially made as to whether or not the empty frequency is actually present in the all empty frequencies stored in the memory 63. When the empty frequency is actually present, this empty frequency may be used as the transmission frequency of the transmitter circuit 40, and also this transmission frequency may be displayed on the LCD 62.

Moreover, in the case that the frequencies in the FM broadcasting band are scanned to seek the empty frequency at the steps 151 to 154, this FM broadcasting band may be subdivided into, for example, a low frequency range and a high frequency range. If the empty frequency can be found out within the low frequency range, then this scanning operation is ended in this low frequency range. Conversely, if such an empty frequency cannot be found out, then a further scanning operation is carried out within the high frequency range. As a result, when the empty frequency can be found out, the frequency scanning operation may be accomplished at an earlier stage.

Alternatively, not only a CD player, but also a portable audio appliance such as an MD (mini disk) player may be used in combination with the transmitter according to the present invention.

In accordance with the present invention, since the transmission frequency is represented on the display unit, the user can readily tunes the reception frequency of the FM receiver to the transmission frequency of the transmitter. In other words, the user can listen to the music and the like reproduced from the CD player and the like by executing a similar operation when the general FM broadcasting channels are selected.

Moreover, since this empty frequency is automatically selected to perform the FM signal transmission, the user need not manipulate the key to select the transmission frequency.

What is claimed is:

1. A transmitter for transmitting an audio signal derived from an audio appliance to an FM (frequency modulation) radio, comprising:
    a transmitter circuit for converting said audio signal derived from said audio appliance into an FM signal within an FM broadcasting band and transmitting said FM signal;
    a receiver circuit having at least a tuner unit;
    a display for displaying thereon a frequency;
    a control circuit for controlling a transmission frequency of said transmitter circuit and a reception frequency of said receiver circuit, wherein
        said control circuit causes said receiver circuit to detect an unused frequency within said FM broadcasting band and to set a frequency corresponding to said detected unused frequency to said transmission frequency, and also causes said display to display thereon said set transmission frequency; and
    a memory connected to said control circuit for storing said detected unused frequency, so that upon initial operation of said transmitter said transmitter circuit is turned off, said receiver circuit is turned on, and the transmission frequency of said transmitter circuit is set to said detected unused frequency read out from said memory.

2. A transmitter as claimed in claim 1, wherein when a power supply of said transmitter is turned ON, said transmission frequency is set and said set transmission frequency is displayed on said display.

3. An automobile audio apparatus, comprising:
    an automobile FM radio and a transmitter for transmitting an audio signal derived from an audio appliance to the automobile FM radio, said transmitter comprising a transmitter circuit for converting said audio signal derived from said audio appliance into an FM signal within an FM broadcasting band and transmitting said FM signal, a receiver circuit having at least a tuner circuit, said receiver circuit detecting an unused frequency within said FM frequency band, a control circuit for controlling a transmission frequency of said transmitter circuit by setting a frequency corresponding to said detected unused frequency to said transmission frequency of said transmitter circuit, and a memory connected to said control circuit for storing said detected unused frequency, so that upon initial operation of said transmitter said transmitter circuit is turned off, said receiver circuit is turned on, and the transmission frequency of said transmitter circuit is set to said detected unused frequency read out from said memory, and a display for displaying thereon said set transmission frequency; and channel selecting means for tuning said reception frequency to said transmission frequency displayed on said display.

* * * * *